US012650634B2

(12) United States Patent
Takai

(10) Patent No.: US 12,650,634 B2
(45) Date of Patent: Jun. 9, 2026

(54) IMAGE PICKUP SYSTEM AND CONTROL APPARATUS THAT PERFORM MANUAL LIGHT EMISSION CONTROL OF SENDER DEVICE AND RECEIVER DEVICE, AND CONTROL METHOD AND STORAGE MEDIUM THEREFOR

(71) Applicant: CANON KABUSHIKI KAISHA, Tokyo (JP)

(72) Inventor: Junji Takai, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 365 days.

(21) Appl. No.: 18/457,532

(22) Filed: Aug. 29, 2023

(65) Prior Publication Data

US 2024/0077786 A1      Mar. 7, 2024

(30) Foreign Application Priority Data

Sep. 1, 2022    (JP) ................................. 2022-139310

(51) Int. Cl.
G03B 15/05            (2021.01)
(52) U.S. Cl.
CPC .................................... G03B 15/05 (2013.01)
(58) Field of Classification Search
None
See application file for complete search history.

(56) References Cited

FOREIGN PATENT DOCUMENTS

| CN | 101765747 | B | * | 11/2015 | ......... G01N 33/0073 |
|---|---|---|---|---|---|
| JP | 2002-169209 | A | | 6/2002 | |
| JP | 2011221363 | A | * | 11/2011 | |
| JP | 7071151 | B2 | * | 5/2022 | |
| KR | 20060076977 | A | * | 7/2006 | ............. H04N 23/74 |

* cited by examiner

*Primary Examiner* — Rodney E Fuller
(74) *Attorney, Agent, or Firm* — Cowan, Liebowitz & Latman, P.C.

(57) ABSTRACT

An image pickup system, which includes an image pickup apparatus, a sender device and a receiver device each including a light emission part and controls light emission amounts thereof, and which achieves the best light emission performance at the time of manual light emission. In the image pickup system: the image pickup apparatus sets manual light emission amounts of the sender device and receiver device, and sets light emission activated setting or light emission deactivated setting on the sender device; the sender device changes a light emission amount settable range in which the manual light emission amount is settable, based on a setting set on the sender device, and notifies the receiver device of the set manual light emission amount; and the receiver device updates the manual light emission amount of the receiver device based on the notified manual light emission amount.

16 Claims, 11 Drawing Sheets

FIG. 4

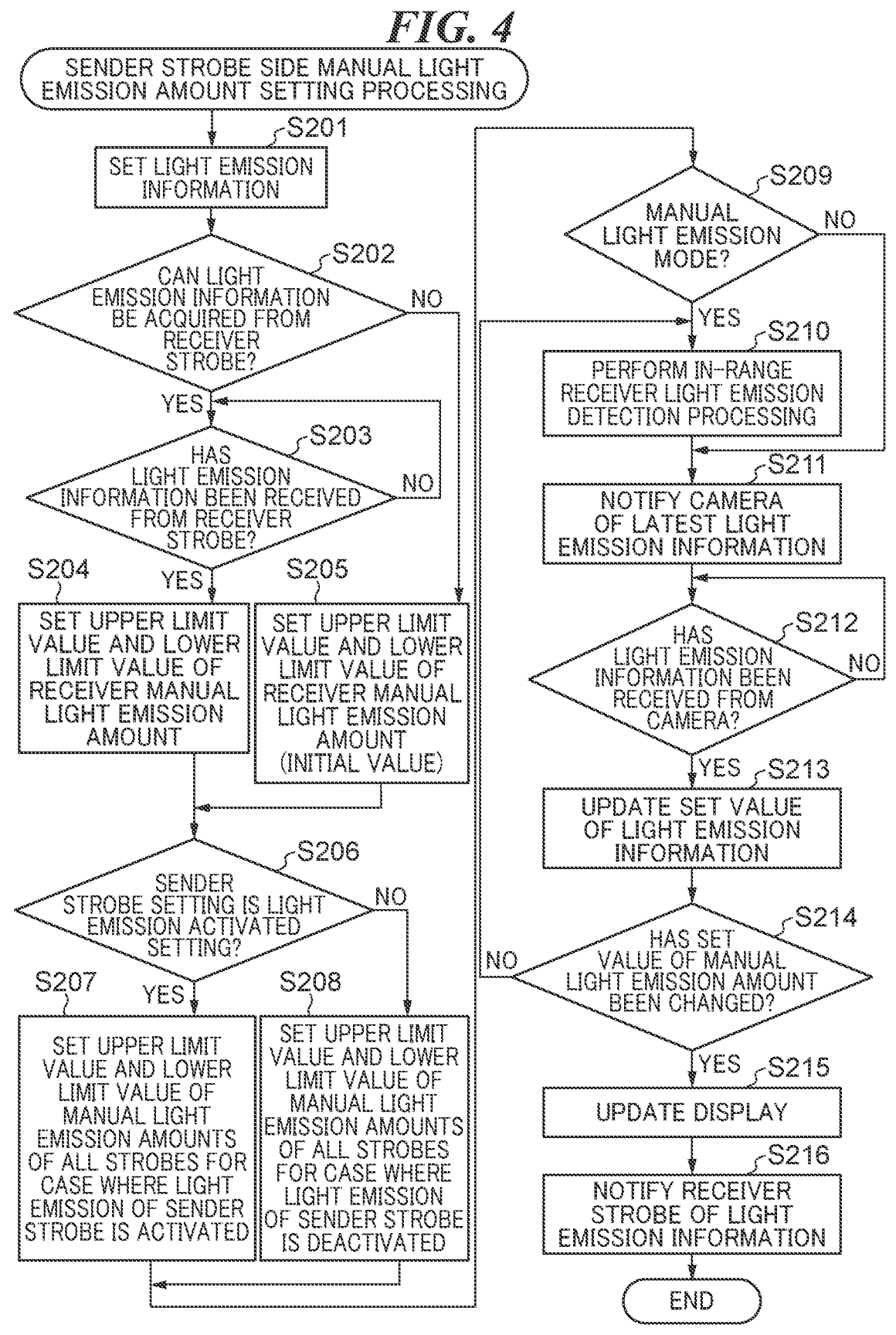

```
      ┌──────────────────────────────────────┐
      │  SENDER STROBE SIDE MANUAL LIGHT      │
      │  EMISSION AMOUNT SETTING PROCESSING   │
      └──────────────────────────────────────┘
                        │  ┌─ S201
                        ▼
              ┌──────────────────────┐
              │  SET LIGHT EMISSION   │
              │     INFORMATION       │
              └──────────────────────┘
                        │  ┌─ S202
                        ▼
              ╱ CAN LIGHT           ╲      NO
             ╱ EMISSION INFORMATION  ╲ ──────────►
             ╲ BE ACQUIRED FROM      ╱
              ╲ RECEIVER STROBE?    ╱
                   │ YES
                   ▼  ┌─ S203
              ╱ HAS                  ╲      NO
             ╱ LIGHT EMISSION         ╲ ──────────►
             ╲ INFORMATION BEEN       ╱
              ╲ RECEIVED FROM        ╱
               ╲ RECEIVER STROBE?   ╱
     S204           │ YES       S205
      ┌──────────────────┐  ┌──────────────────┐
      │ SET UPPER LIMIT  │  │ SET UPPER LIMIT  │
      │ VALUE AND LOWER  │  │ VALUE AND LOWER  │
      │ LIMIT VALUE OF   │  │ LIMIT VALUE OF   │
      │ RECEIVER MANUAL  │  │ RECEIVER MANUAL  │
      │ LIGHT EMISSION   │  │ LIGHT EMISSION   │
      │ AMOUNT           │  │ AMOUNT           │
      └──────────────────┘  │ (INITIAL VALUE)  │
                            └──────────────────┘
                   ┌─ S206
                   ▼
              ╱ SENDER              ╲      NO
             ╱ STROBE SETTING IS     ╲ ──────────►
             ╲ LIGHT EMISSION        ╱
              ╲ ACTIVATED SETTING?  ╱
    S207           │ YES       S208
      ┌──────────────────┐  ┌──────────────────┐
      │ SET UPPER LIMIT  │  │ SET UPPER LIMIT  │
      │ VALUE AND LOWER  │  │ VALUE AND LOWER  │
      │ LIMIT VALUE OF   │  │ LIMIT VALUE OF   │
      │ MANUAL LIGHT     │  │ MANUAL LIGHT     │
      │ EMISSION AMOUNTS │  │ EMISSION AMOUNTS │
      │ OF ALL STROBES   │  │ OF ALL STROBES   │
      │ FOR CASE WHERE   │  │ FOR CASE WHERE   │
      │ LIGHT EMISSION   │  │ LIGHT EMISSION   │
      │ OF SENDER STROBE │  │ OF SENDER STROBE │
      │ IS ACTIVATED     │  │ IS DEACTIVATED   │
      └──────────────────┘  └──────────────────┘
```

```
                        ┌─ S209
                        ▼
              ╱ MANUAL              ╲      NO
             ╱ LIGHT EMISSION        ╲ ──────────►
             ╲ MODE?                 ╱
               ╲                    ╱
                   │ YES
                   ▼  ┌─ S210
              ┌──────────────────────┐
              │  PERFORM IN-RANGE     │
              │  RECEIVER LIGHT       │
              │  EMISSION DETECTION   │
              │  PROCESSING           │
              └──────────────────────┘
                        │  ┌─ S211
                        ▼
              ┌──────────────────────┐
              │  NOTIFY CAMERA        │
              │  OF LATEST LIGHT      │
              │  EMISSION INFORMATION │
              └──────────────────────┘
                        │  ┌─ S212
                        ▼
              ╱ HAS                  ╲      NO
             ╱ LIGHT EMISSION         ╲ ──────────►
             ╲ INFORMATION BEEN       ╱
              ╲ RECEIVED FROM        ╱
               ╲ CAMERA?            ╱
                   │ YES  ┌─ S213
                   ▼
              ┌──────────────────────┐
              │  UPDATE SET VALUE     │
              │  OF LIGHT EMISSION    │
              │  INFORMATION          │
              └──────────────────────┘
                        │  ┌─ S214
                        ▼
              ╱ HAS SET             ╲      NO
             ╱ VALUE OF MANUAL       ╲ ──────────►
             ╲ LIGHT EMISSION AMOUNT ╱
              ╲ BEEN CHANGED?       ╱
                   │ YES  ┌─ S215
                   ▼
              ┌──────────────────────┐
              │    UPDATE DISPLAY     │
              └──────────────────────┘
                        │  ┌─ S216
                        ▼
              ┌──────────────────────┐
              │  NOTIFY RECEIVER      │
              │  STROBE OF LIGHT      │
              │  EMISSION INFORMATION │
              └──────────────────────┘
                        │
                        ▼
                  ┌──────────┐
                  │   END    │
                  └──────────┘
```

*FIG. 6A*

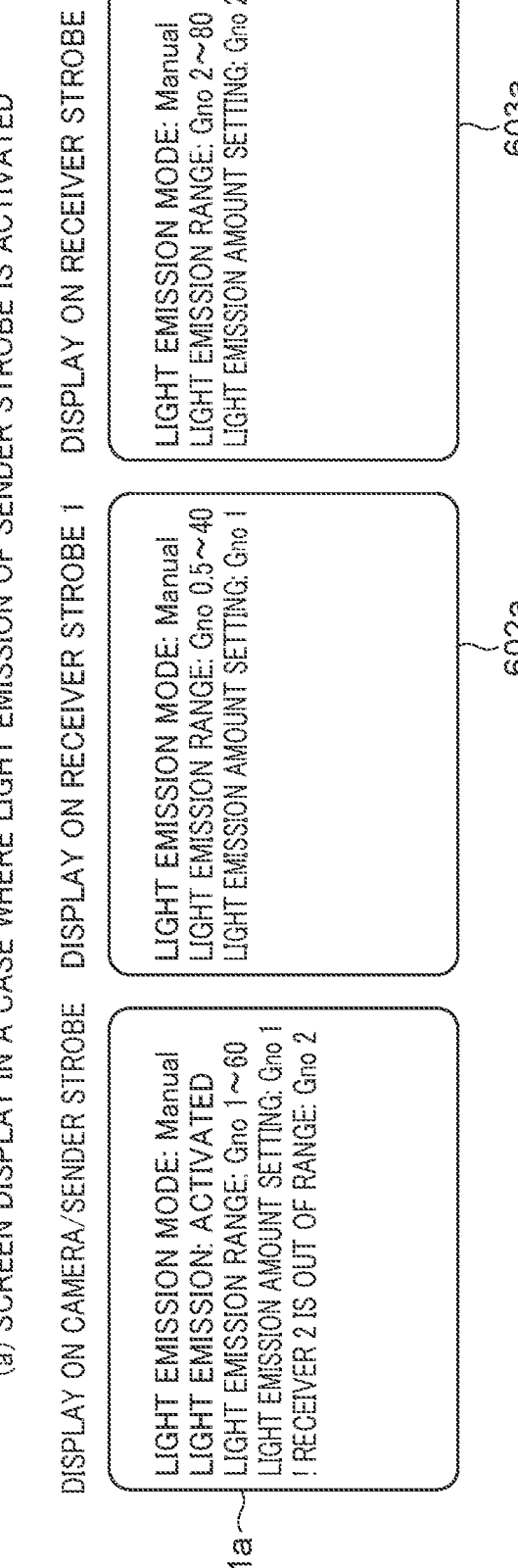

(a) SCREEN DISPLAY IN A CASE WHERE LIGHT EMISSION OF SENDER STROBE IS ACTIVATED

DISPLAY ON CAMERA/SENDER STROBE     DISPLAY ON RECEIVER STROBE 1     DISPLAY ON RECEIVER STROBE 2

LIGHT EMISSION MODE: Manual
LIGHT EMISSION: ACTIVATED
LIGHT EMISSION RANGE: Gno 1~60
LIGHT EMISSION AMOUNT SETTING: Gno 1
! RECEIVER 2 IS OUT OF RANGE: Gno 2

601a

LIGHT EMISSION MODE: Manual
LIGHT EMISSION RANGE: Gno 0.5~40
LIGHT EMISSION AMOUNT SETTING: Gno 1

602a

LIGHT EMISSION MODE: Manual
LIGHT EMISSION RANGE: Gno 2~80
LIGHT EMISSION AMOUNT SETTING: Gno 2

(b) SCREEN DISPLAY IN A CASE WHERE LIGHT EMISSION OF SENDER STROBE IS DEACTIVATED

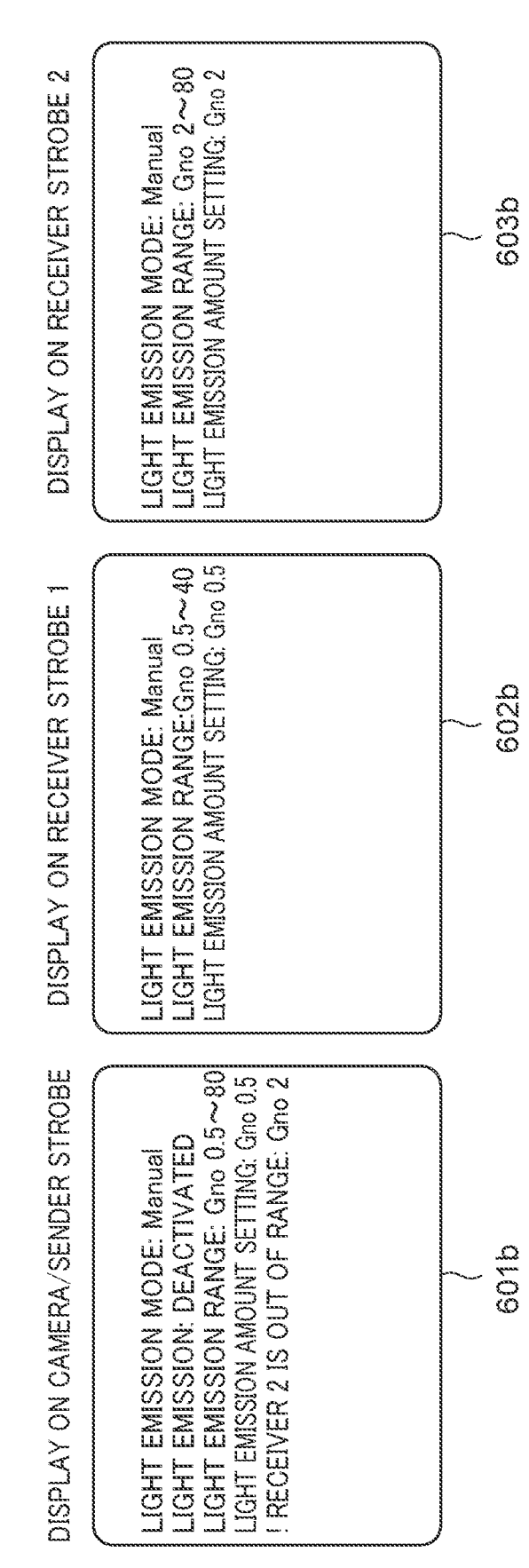

DISPLAY ON CAMERA/SENDER STROBE

LIGHT EMISSION MODE: Manual
LIGHT EMISSION: DEACTIVATED
LIGHT EMISSION RANGE: Gno 0.5~80
LIGHT EMISSION AMOUNT SETTING: Gno 0.5
! RECEIVER 2 IS OUT OF RANGE: Gno 2

601b

DISPLAY ON RECEIVER STROBE 1

LIGHT EMISSION MODE: Manual
LIGHT EMISSION RANGE: Gno 0.5~40
LIGHT EMISSION AMOUNT SETTING: Gno 0.5

602b

DISPLAY ON RECEIVER STROBE 2

LIGHT EMISSION MODE: Manual
LIGHT EMISSION RANGE: Gno 2~80
LIGHT EMISSION AMOUNT SETTING: Gno 2

603b

IMAGE PICKUP SYSTEM AND CONTROL APPARATUS THAT PERFORM MANUAL LIGHT EMISSION CONTROL OF SENDER DEVICE AND RECEIVER DEVICE, AND CONTROL METHOD AND STORAGE MEDIUM THEREFOR

BACKGROUND OF THE INVENTION

Field of the Invention

The present invention relates to an image pickup system and a control apparatus, and a control method and storage medium therefor, and more particularly, to an image pickup system and a control apparatus that perform manual light emission control of a sender device and a receiver device, and a control method and storage medium therefor.

Description of the Related Art

Conventionally, there is known a wireless multi-lamp control method in which a strobe functioning as a sender device clipped on a camera notifies a strobe functioning as a receiver device of information such as a light emission mode and a light emission amount and performs light emission in synchronization with a shooting timing of the camera.

For example, in a case where the sender device sets a manual light emission mode and a manual light emission amount, the receiver device performs light emission control with the same setting as the manual light emission mode and the manual light emission amount of the sender device.

Further, Japanese Laid-Open Patent Publication (kokai) No. 2002-169209 discloses a method for controlling, when a built-in strobe of a camera is caused to emit light, a light emission amount of the built-in strobe based on a light emission amount of a receiver device.

However, according to the conventional technology, even in a case where setting is made in such a way that the sender device does not emit light, the sender device notifies the receiver device of a light emission amount corresponding to light emission performance of the sender device, and thus there is a possibility that the best light emission performance of the receiver device cannot be achieved.

In addition, in the method disclosed in Japanese Laid-Open Patent Publication (kokai) No. 2002-169209, since the light emission amount of the built-in strobe of the camera as the sender device is linked to the setting of the receiver device, there is a possibility that the best performance of the sender device cannot be achieved.

SUMMARY OF THE INVENTION

The present invention provides an image pickup system and a control apparatus that are capable of improving light emission performance at the time of manual light emission, and a control method and storage medium therefor.

Accordingly, the present invention provides an image pickup system that includes an image pickup apparatus, a sender device including a first light emission part, and a receiver device including a second light emission part and controls light emission amounts of the sender device and the receiver device, the image pickup system comprising: at least one memory that stores a set of instructions; and at least one processor that is configured to, based on the instructions, cause the image pickup apparatus to set manual light emission amounts of the sender device and the receiver device, and set the sender device to have light emission activated setting or light emission deactivated setting, cause the sender device to change a light emission amount settable range in which the manual light emission amount is settable, between a case where the sender device is set to have the light emission activated setting and a case where the sender device is set to have the light emission deactivated setting, and notify the receiver device of the set manual light emission amount, and cause the receiver device to update the manual light emission amount of the receiver device based on the manual light emission amount notified from the sender device.

Accordingly, the present invention provides a control apparatus that controls a sender device which electrically connects to an image pickup apparatus and includes a first light emission part, the sender device being configured to wirelessly communicate with a receiver device which includes a second light emission part, the control apparatus comprising at least one memory that stores a set of instructions, and at least one processor that is configured to, based on the instructions, cause the control apparatus to acquire, from the image pickup apparatus, manual light emission amounts of the sender device and the receiver device, and setting in which the sender device is set to have one of light emission activated setting and light emission deactivated setting, which are set in the image pickup apparatus, change a light emission amount settable range in which the manual light emission amount is settable in the image pickup apparatus, between a case where the sender device is set to have the light emission activated setting and a case where the sender device is set to have the light emission deactivated setting, and notify the receiver device of the manual light emission amount acquired from the image pickup apparatus.

According to the present invention, it is possible to improve light emission performance at the time of manual light emission.

Further features of the present invention will become apparent from the following description of exemplary embodiments with reference to the attached drawings.

BRIEF DESCRIPTION OF THE DRAWINGS

FIG. 4 is a flowchart of a sender strobe side manual light emission amount setting processing according to the first embodiment.

FIGS. 6A and 6B are diagrams showing an example of a manual light emission mode display according to the first and second embodiments.

DESCRIPTION OF THE EMBODIMENTS

The present invention will now be described in detail below with reference to the accompanying drawings showing embodiments thereof. It should be noted that constituent elements described in the embodiments are intended to be exemplary forms of the present invention, and the scope of the present invention is not limited thereto.

Hereinafter, an operation of an image pickup system 1 according to a first embodiment will be described with reference to FIGS. 1 to 4.

Figure 1:
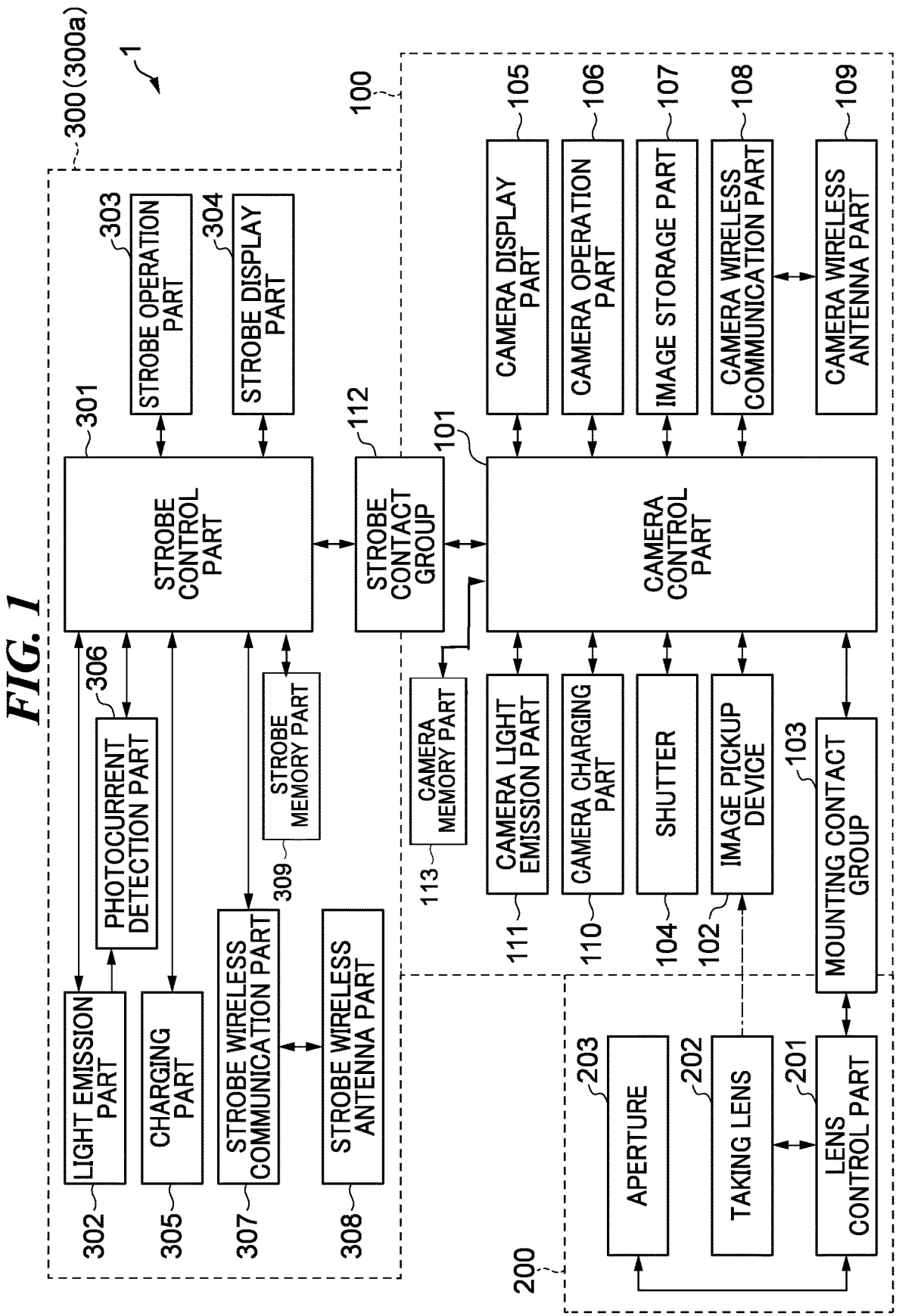
FIG. 1 is a diagram showing hardware configurations of a camera and a sender strobe included in an image pickup system according to a first embodiment.

FIG. 1 is a diagram showing hardware configurations of a camera 100 (image pickup apparatus) and a sender strobe 300a (sender device) included in the image pickup system 1 according to the first embodiment. Although not shown in FIG. 1, the image pickup system 1 includes receiver strobes 300b and 300c (receiver devices) wirelessly connected to the sender strobe 300a. A hardware configuration of each of the receiver strobes 300b and 300c is the same as the hardware configuration of the sender strobe 300a. Therefore, in the following description of the hardware configuration of the sender strobe 300a, the hardware configuration of the sender strobe 300a will be described as the hardware configuration of the "strobe 300" that collectively refers to the sender strobe 300a and the receiver strobes 300b and 300c.

Referring FIG. 1, a lens 200 is mounted on a front surface of the camera 100. The lens 200 is interchangeable, and the camera 100 and the lens 200 are electrically connected to each other via a mounting contact group 103. The strobe 300 is mounted on an upper surface of the camera 100. The strobe 300 is interchangeable, and the camera 100 and the strobe 300 are electrically connected to each other via a strobe contact group 112.

The camera 100 further includes a camera control part 101, an image pickup device 102, a shutter 104, a camera display part 105, a camera operation part 106, an image storage part 107, a camera wireless communication part 108, a camera wireless antenna part 109, a camera charging part 110, a camera light emission part 111, and a camera memory part 113.

The lens 200 further includes a lens control part 201, a taking lens 202, and an aperture 203.

The strobe 300 further includes a strobe control part 301, a light emission part 302, a strobe operation part 303, a strobe display part 304, a charging part 305, a photocurrent detection part 306, a strobe wireless communication part 307, a strobe wireless antenna part 308, and a strobe memory part 309.

The camera control part 101 is a microcomputer that controls an operation of each part of the camera 100.

The image pickup device 102 converts light incident from a subject through the taking lens 202 into an electric signal to generate image data, and outputs the image data to the camera control part 101.

The shutter 104, which is a focal plane shutter, is disposed between the image pickup device 102 and the taking lens 202, and operates according to an instruction from the camera control part 101. The shutter 104 includes a front curtain and a rear curtain, wherein as the front curtain travels to open the shutter 104, exposure of the image pickup device 102 starts, and as the rear curtain travels to close the shutter 104, exposure of the image pickup device 102 ends. It should be noted that at least one of the front curtain and the rear curtain of the shutter 104 may be configured as a so-called electronic shutter.

The camera display part 105 displays shooting information and a shot image according to an instruction from the camera control part 101. The camera operation part 106 detects a user operation on an operation member to be operated by a user, specifically, a release button, a switch, a dial, a connection device, or the like, which are mounted on the camera 100, and transmits an instruction signal corresponding to the operation to the camera control part 101. For example, in a case where the user half-presses a release button, an SW1 signal is output to the camera control part 101 as an instruction signal corresponding to the operation. In a case where the user performs a full-pressing operation of deeply pressing the release button, an SW2 signal is output to the camera control part 101 as an instruction signal corresponding to the operation.

The camera control part 101 controls the operation of the camera 100 based on an instruction signal from the camera operation part 106. In a case where the instruction signal from the camera operation part 106 is the SW1 signal, the camera control part 101 drives the image pickup device 102 to pick up an image, repeats photometric control (AE operation) of measuring a luminance of a subject based on the image pickup result, and determines an exposure control value to be used at the time of shooting based on the photometric result. It should be noted that, in the present embodiment, a shutter speed, an aperture value, and an ISO sensitivity used at the time of shooting are collectively referred to as the "exposure control value". The determined exposure control value is displayed on a screen of the camera display part 105. In a case where the instruction signal from the camera operation part 106 is the SW2 signal, the camera control part 101 drives the aperture 203, sets the sensitivity (ISO sensitivity) of the image pickup device 102, and controls the shutter 104 to irradiate the image pickup device 102 with light. The camera control part 101 performs control to display the shot image on the screen of the camera display part 105 according to the image data acquired from the image pickup device 102 and write the image data in the image storage part 107.

The camera wireless communication part 108 transmits and receives wireless communication information to and from the strobe 300 via the camera wireless antenna part 109. The camera control part 101 can notify the strobe 300 of light emission amount information and light emission timing information via the camera wireless communication part 108 and the camera wireless antenna part 109.

The camera charging part 110 charges a capacitor (not shown) with electric energy for generating illumination light with which a subject whose image is to be picked up is irradiated, by using power of a battery (not shown) mounted on the camera 100 (charging operation). The charging operation is controlled by the camera control part 101, and in the charging operation, the camera control part 101 detects a voltage of the electric energy charged in the capacitor, and stops the charging operation when the voltage becomes equal to or higher than a predetermined voltage threshold (charging is completed). The camera control part 101 starts the charging operation when the voltage becomes smaller than the predetermined voltage threshold. The camera light emission part 111 drives a light emission circuit according to an instruction from the camera control part 101, emits light by discharging electric energy charged in a capacitor for light emission to a discharge tube, and irradiates the subject with the light through a light emission optical system. The camera control part 101 performs light emission time management, and stops light emission when a predetermined light emission time is reached, thereby controlling a light emission amount of the camera light emission part 111.

The strobe contact group 112 is a connection terminal for communication between the camera control part 101 and the strobe control part 301, by which the camera control part 101 can notify the strobe 300 of information regarding light emission and the light emission timing information for synchronization with shooting.

It should be noted that, in the present embodiment, the strobe 300 connected to the camera 100 via the strobe contact group 112 is controlled as the sender strobe 300a. The strobe 300 that is not connected to the camera 100 via the strobe contact group 112 is controlled as the receiver strobe 300b or 300c via the sender strobe 300a. It should be noted that the camera 100 is also capable of performing wireless communication simultaneously with a plurality of strobes 300 via the camera wireless communication part 108 and the camera wireless antenna part 109.

Next, a configuration of the lens 200 will be described.

The lens control part 201 is a microcomputer that controls an operation of each part of the lens 200. The taking lens 202 includes a plurality of lenses and forms a subject image on the image pickup device 102. Further, the taking lens 202 includes the aperture 203 for adjusting the amount of light and a focus lens (not shown) for adjusting a focus.

The lens control part 201 is controlled by the camera control part 101 via the mounting contact group 103, and adjusts the amount of light to be taken into the camera 100 and the focus according to an instruction from the camera control part 101.

Next, a configuration of the strobe 300 will be described.

The strobe control part 301 (control apparatus) is a microcomputer that controls an operation of each part of the strobe 300. The strobe control part 301 is capable of communicating with the camera control part 101 via the strobe contact group 112, and capable of, via the strobe contact group 112, receiving a light emission control instruction from the camera 100 and transmitting and receiving light emission information to and from the camera 100. The light emission part 302 includes a discharge tube, a light emission circuit, and a light emission optical system.

The charging part 305 charges a capacitor (not shown) with electric energy for generating illumination light with which a subject whose image is to be picked up is irradiated, by using power of a battery (not shown) mounted on the strobe 300 (charging operation). The charging operation is controlled by the strobe control part 301, and in the charging operation, the strobe control part 301 detects a voltage of the electric energy charged in the capacitor, and stops the charging operation when the voltage becomes equal to or higher than a predetermined voltage threshold (charging is completed). The strobe control part 301 starts the charging operation when the voltage becomes smaller than the predetermined voltage threshold. A charging voltage and charging completion flag information are transmitted to the camera control part 101 via the strobe contact group 112.

The strobe operation part 303 detects a user operation on an operation member to be operated by the user, specifically, a button, a dial, or the like, which are mounted on the strobe 300, and transmits an instruction signal corresponding to the operation to the strobe control part 301. The strobe display part 304 displays a light emission mode, a light emission amount, and the like, according to an instruction from the strobe control part 301.

The light emission part 302 drives the light emission circuit according to an instruction from the strobe control part 301, emits light by discharging electric energy charged in a capacitor for light emission to the discharge tube, and irradiates the subject with the light through the light emission optical system. A light emission amount of the light emission part 302 is monitored by the strobe control part 301 via the photocurrent detection part 306, and when a predetermined light emission amount is observed, the light emission part 302 stops light emission. A light receiving diode, a circuit that integrates a current generated from the light receiving diode and converts the integrated current into a voltage, and the like, are disposed in the photocurrent detection part 306. The strobe control part 301 compares a photocurrent or an integrated voltage of the photocurrent observed by the strobe control part 301 with a predetermined threshold value to determine whether or not the light emission part 302 has emitted light by the predetermined light emission amount.

The predetermined light emission amount may be set by the user through the strobe operation part 303, or may be acquired from the camera control part 101 through communication via the strobe contact group 112. Upon receiving a control signal from the camera control part 101 via the strobe contact group 112, the strobe control part 301 can cause the light emission part 302 to emit light at the predetermined light emission amount in synchronization with a shooting operation of the camera 100.

The strobe wireless communication part 307 transmits and receives wireless communication information to and from the camera 100 or another strobe 300 via the strobe wireless antenna part 308. The strobe control part 301 is capable of receiving the light emission timing information and the light emission amount information from the camera 100 or another strobe 300 via the strobe wireless communication part 307 and the strobe wireless antenna part 308.

Hereinafter, the operation of the image pickup system 1 according to the present embodiment will be described with reference to FIGS. 2A to 6B.

Figure 2A:
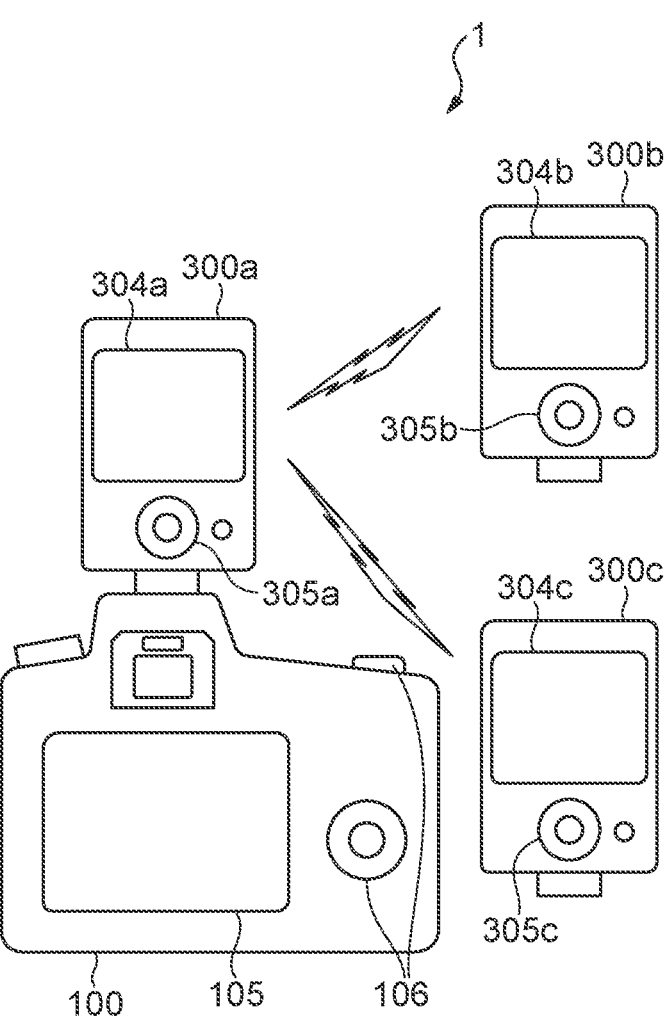
FIGS. 2A and 2B are schematic configuration diagrams of the image pickup system according to the first embodiment in which the sender strobe is wirelessly connected to receiver strobes.
Figure 2B:
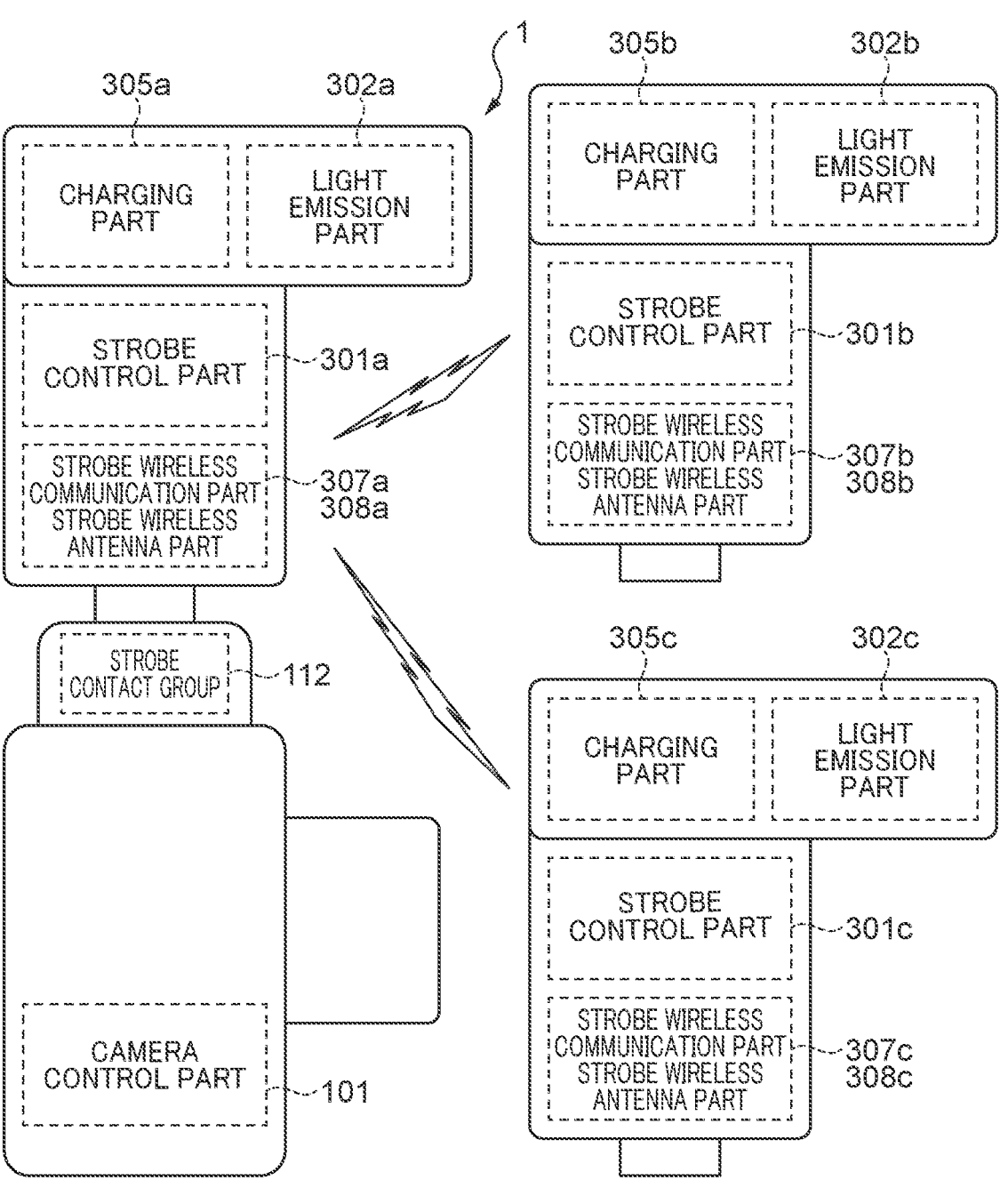

FIGS. 2A and 2B are schematic configuration diagrams of the image pickup system 1 according to the present embodiment in which the sender strobe 300a is wirelessly connected to the receiver strobes 300b and 300c. FIG. 2A is a rear view illustrating each apparatus (the camera 100, the sender strobe 300a, and the receiver strobes 300b and 300c) included in the image pickup system 1. FIG. 2B is a side view of each apparatus included in the image pickup system 1.

The camera 100 and the sender strobe 300a are physically connected to each other. The camera control part 101 communicates with the sender strobe 300a via the strobe contact group 112.

A strobe wireless communication part 307a transmits and receives light emission information and the like to and from the receiver strobes 300b and 300c via a strobe wireless antenna part 308a.

The strobe control part 301 manages a lower limit value and an upper limit value (possible manual light emission range) of a manual light emission amount set in accordance with the performances of the light emission part 302 and the charging part 305.

The strobe display part 304 displays various settings related to light emission, and the strobe operation part 303 receives user input for various settings related to light emission.

The camera display part 105 displays various settings for the strobe 300, and the camera operation part 106 receives user input for release control and various settings for the strobe 300.

It should be noted that, in the present embodiment, the number of receiver strobes included in the image pickup system 1 is two, but may be one or three or more.

Figure 3:
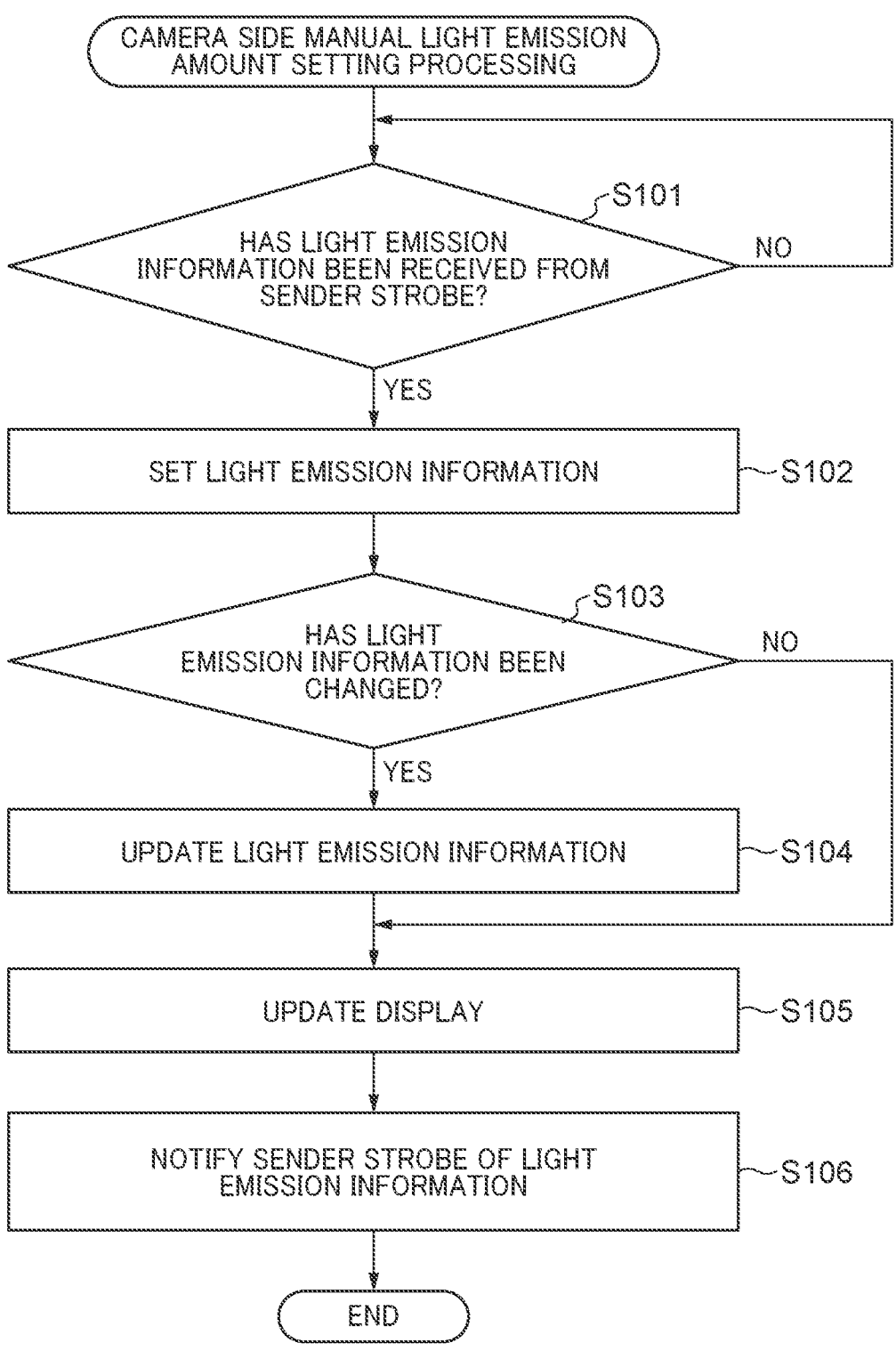
FIG. 3 is a flowchart of camera side manual light emission amount setting processing according to the first embodiment.

FIG. 3 is a flowchart of camera 100 side manual light emission amount setting processing according to the first embodiment.

In step S101, the camera control part 101 determines whether or not the light emission information held by the sender strobe 300a has been received from the sender strobe 300a. Specifically, reception of the light emission information from the sender strobe 300a is monitored. Thereafter, when the reception of the light emission information via the strobe contact group 112 is completed (YES in step S101), the processing proceeds to step S102.

In step S102, the camera control part 101 performs setting by using the light emission information obtained from the sender strobe 300a in step S101.

The light emission information acquired from the sender strobe 300a includes "sender strobe setting (light emission activated setting or light emission deactivated setting (that is, light emission of the sender strobe is activated or the light emission of sender strobe is deactivated))", a "light emission mode (manual light emission mode or automatic dimming light emission mode)", the "upper limit value and lower limit value of the manual light emission amount", and the "manual light emission amount". The light emission information further includes "out-of-range receiver manual light emission amount data". Here, the "light emission activated setting" is setting in which the light emission part is caused to emit light in order to emit auxiliary light when shooting with the image pickup apparatus, and the "light emission deactivated setting" is setting in which the light emission part is not caused to emit light in order to emit the auxiliary light when shooting with the image pickup apparatus. In the light emission deactivated setting, the light emission part may be caused to emit light as long as the light is used for purposes other than the auxiliary light when shooting with the image pickup apparatus.

According to the present embodiment, it is possible to improve manual light emission performance in the wireless multi-lamp control by switching the "sender strobe setting (light emission activated setting or light emission deactivated setting)" which is the light emission information.

Specifically, in a case where the "sender strobe setting" is the "light emission activated setting", the "upper limit and lower limit of the manual light emission amount" are set to values suitable for light emission by the sender strobe 300a. On the other hand, in a case where the "sender strobe setting" is the "light emission deactivated setting", the "upper limit and lower limit of the manual light emission amount" are set to values suitable for light emission by the receiver strobes 300b and 300c.

In step S103, it is determined whether or not the light emission information has been changed by the user by a user operation on the camera operation part 106 (first setting unit/second setting unit). Here, the light emission information changeable by the user includes the "sender strobe setting (light emission activated setting or light emission deactivated setting)", the "light emission mode (manual light emission mode or automatic dimming light emission mode)", and the "manual light emission amount".

In a case where the light emission information has been changed by the user (YES in step S103), the processing proceeds to step S104, and in a case where the light emission information has not been changed by the user (NO in step S103), the processing proceeds to step S105.

In step S104, the camera control part 101 updates the set value of the light emission information from the value set in S102 based on the light emission information acquired from the sender strobe 300a in S101 to the value set (changed) by the user in S103.

In step S105, the camera control part 101 displays the value updated in step S104 on the screen of the camera display part 105. It should be noted that, in a case where it is determined in step S103 that the light emission information has not been changed by the user, the camera control part 101 displays the value set in step S102 on the screen of the camera display part 105.

Here, it is further determined whether or not there is a receiver strobe whose manual light emission amount is out of the possible manual light emission range based on the "out-of-range receiver manual light emission amount data" included in the light emission information. In a case where the determination result indicates that there is a receiver strobe whose manual light emission amount is out of the possible manual light emission range, the camera control part 101 (notification unit) displays an "out-of-range receiver manual light emission amount indication" on the screen of the camera display part 105 to notify the user of that there is a receiver strobe whose manual light emission amount is out of the possible manual light emission range. An example of the out-of-range receiver manual light emission amount indication will be described in a description of sender strobe side manual light emission amount setting processing (FIG. 4) below.

In step S106, the camera control part 101 notifies the sender strobe 300a of the latest light emission information via the strobe contact group 112, and ends the processing of FIG. 3.

FIG. 4 is a flowchart of the sender strobe 300a side manual light emission amount setting processing according to the first embodiment. This processing starts when the sender strobe 300a is started.

In step S201, first, a strobe control part 301a reads light emission information stored as an initial value in a RAM (not shown) in the sender strobe 300a and performs setting by using the read light emission information.

In step S202, the strobe control part 301a determines whether or not light emission information held by the receiver strobes 300b and 300c can be acquired from the receiver strobes 300b and 300c. Specifically, the strobe control part 301a first monitors reception of either information indicating that the light emission information can be acquired or information indicating that the light emission information cannot be acquired, from the receiver strobes 300b and 300c, by using the strobe wireless communication part 307a. Thereafter, in a case where the strobe wireless communication part 307a has received the information, indicating that the light emission information can be acquired, from any of the receiver strobes 300b and 300c via the strobe wireless antenna part 308a, the strobe control part 301a advances the processing to step S203. On the other hand, in a case where the strobe wireless communication part 307a has received the information, indicating that the light emission information cannot be acquired, from any of the receiver strobes 300b and 300c via the strobe wireless antenna part 308a, the strobe control part 301a advances the processing to step S205.

In step S203, the strobe control part 301a determines whether or not the light emission information which is held by the receiver strobe 300b, 300c, has been received from a receiver strobe from which the information indicating that the light emission information can be acquired is transmitted, among the receiver strobes 300b and 300c. Specifically, the strobe control part 301a first monitors reception of the light emission information from the receiver strobes 300b and 300c by using the strobe wireless communication part 307a. Thereafter, when the strobe wireless communication part 307a has completed the reception of the light emission information via the strobe wireless antenna part 308a (YES in step S203), the strobe control part 301a advances the processing to step S204. The light emission information received here includes the possible manual light emission range indicating the upper limit value and the lower limit value of the manual light emission amount of the receiver strobe which is a transmission source.

In step S204, the strobe control part 301a sets an upper limit value and lower limit value of a receiver manual light emission amount (possible receiver side light emission range). Specifically, the strobe control part 301a selects the maximum value from the upper limit values of the possible manual light emission range included in the light emission information received in step S203, and sets the maximum value as the upper limit value of the receiver manual light emission amount. Similarly, the strobe control part 301a selects the minimum value from the lower limit values of the possible manual light emission range included in the light emission information received in step S203, and sets the minimum value as the lower limit value of the receiver manual light emission amount.

For example, in a case where the information indicating that light emission information can be acquired has been received from both the receiver strobes 300b and 300c in step S202, the strobe control part 301a receives the light emission information from both the receiver strobes 300b and 300c in step S203.

Here, a case where the possible manual light emission ranges of the receiver strobes 300b and 300c (first and second receiver devices) are different will be exemplified.

[Lower limit value/upper limit value] of manual
light emission amount of receiver strobe 300b=
[Gno 0.5/Gno 40]

[Lower limit value/upper limit value] of manual
light emission amount of receiver strobe 300c=
[Gno 2/Gno 80]

In this case, the value of the receiver strobe 300b having a smaller lower limit value of the manual light emission amount is selected as the lower limit value of the receiver manual light emission amount. Then, the value of the receiver strobe 300c having a larger upper limit value of the manual light emission amount is selected as the upper limit value of the receiver manual light emission amount. That is, in step S204, the lower limit value of the receiver manual light emission amount is set to Gno 0.5, and the upper limit value of the receiver manual light emission amount is set to Gno 80.

Here, "Gno" is a unit called a "guide number" representing the intensity of light emission of the strobe, and the maximum light emission distance can be obtained based on the guide number (intensity of light emission), and the aperture value and the ISO sensitivity which are shooting parameters.

After the upper limit value of the receiver manual light emission amount and the lower limit value of the receiver manual light emission amount are set by the above method, the strobe control part 301a advances the processing from step S204 to step S206.

In step S205, the upper limit value and lower limit value (initial value) of the receiver manual light emission amount, which are the values stored in advance in the RAM (not shown) in the sender strobe 300a and read in step S201, are set as the possible receiver side light emission range, and the processing proceeds to step S206.

In step S206, the strobe control part 301a determines whether or not the "sender strobe setting" of the light emission information is the "light emission activated setting". In a case where the "sender strobe setting" is the "light emission activated setting" (YES in step S206), the strobe control part 301a advances the processing to step S207. On the other hand, in a case where the "sender strobe setting" is the "light emission deactivated setting" (NO in step S206), the strobe control part 301a advances the processing to step S208.

In step S207, the strobe control part 301a (switching unit) sets the upper limit value and lower limit value of the manual light emission amount of all the strobes (a light emission amount range for all the strobes: a light emission amount settable range) to be used for a case where the "sender strobe setting" is the "light emission activated setting". It should be noted that, here, all the strobes refer to all the strobes existing in the image pickup system 1, that is, the sender strobe 300a and the receiver strobes 300b and 300c. In this case, a range from the upper limit value to the lower limit value of the manual light emission amount settable in the sender strobe 300a (a possible sender side light emission range) is set as the light emission amount range for all the strobes. That is, the strobe control part 301a reads the upper limit value and lower limit value of the manual light emission amount of the sender strobe 300a from the RAM (not shown) in the sender strobe 300a, and sets the read upper limit value and lower limit value as the upper limit value and lower limit value of the light emission amount range for all the strobes.

For example, in a case where the lower limit value of the manual light emission amount of the sender strobe 300a is Gno 1 and the upper limit value of the manual light emission amount is Gno 60, the lower limit value of the light emission amount range for all the strobes set in step S206 is set to Gno 1 and the upper limit value of the light emission amount range for all the strobes is set to Gno 60.

After the upper limit value and lower limit value of the light emission amount range for all the strobes are set in the manner above, the processing proceeds from step S207 to step S209.

In step S208, the strobe control part 301a (switching unit) sets the light emission amount range for all the strobes to be used for a case where the "sender strobe setting" is the "light emission deactivated setting". It should be noted that, although here, all the strobes refer to all the strobes existing in the image pickup system 1, the setting in the sender strobe 300a is the "light emission deactivated setting" here, that is, all the strobes substantially refer to the receiver strobes 300b and 300c. In this case, the possible receiver side light emission range set in step S204 or step S205 is set as the light emission amount range for all the strobes.

Specifically, in a case where the lower limit value and upper limit value of the receiver manual light emission amount are set in step S204, the lower limit value and upper limit value of the receiver manual light emission amount are set as the upper limit value and lower limit value of the light emission amount range for all the strobes. For example, Gno 0.5 which is the lower limit value of the receiver manual light emission amount (exemplified in the description of the processing of step S204) is set as the lower limit value of the light emission amount range for all the strobes. Similarly, Gno 80 which is the upper limit value of the receiver manual light emission amount (exemplified in the description of the processing of step S204) is set as the upper limit value of the light emission amount range for all the strobes.

After the upper limit value of the manual light emission amounts of all the strobes and the lower limit value of the manual light emission amounts of all the strobes are set in a manner above, the strobe control part 301a advances the processing from step S208 to step S209.

In step S209, the strobe control part 301a acquires the light emission information including the "light emission mode" and the "manual light emission amount" held in the camera 100 from the camera 100, and determines whether or not the "light emission mode" included in the light emission information is set to the "manual light emission mode". In a case where the "light emission mode" is set to the "manual light emission mode" (YES in step S209), the strobe control part 301a advances the processing to step S210. On the other hand, in a case where the "light emission mode" is not set to the "manual light emission mode" but set to the "automatic dimming light emission mode" (NO in step S209), the strobe control part 301a advances the processing to step S211.

In step S210, the strobe control part 301a performs in-range receiver light emission detection processing of detecting whether or not the "manual light emission amount" acquired in step S209 falls within the possible manual light emission range of each receiver strobe.

Hereinafter, the in-range receiver light emission detection processing for a case where the "sender strobe setting" included in the light emission information set in step S201 is the "light emission deactivated setting" will be described.

First, it is detected whether or not the "manual light emission amount" falls within a range between the upper limit value and the lower limit value of the manual light emission amount of each receiver strobe (hereinafter, also referred to as a "manual light emission amount range of each receiver").

In a case where the "manual light emission amount" is out of the possible manual light emission range of at least one of the receiver strobe 300b and the receiver strobe 300c, the strobe control part 301a creates the "out-of-range receiver manual light emission amount data". The created data is used for updating the screen (display) of the camera display part 105 in step S105 described above and updating a screen (display) of a strobe display part 304 in step S215 to be described below.

The "out-of-range receiver manual light emission amount data" refers to the following data.

RcvManualRangeOver [receiver number]=[sign],[set Gno corresponding to receiver number]

The receiver number "1" represents the receiver strobe 300b. The receiver number "2" represents the receiver strobe 300c.

The sign "+" indicates that the "possible manual light emission range" is set to a range over the "manual light emission amount", and the sign "–" indicates that the "possible manual light emission range" is set to a range under the "manual light emission amount". Further, the sign "0" indicates that the "manual light emission amount" falls within the "possible manual light emission range".

The "set Gno corresponding to receiver number" indicates Gno of the lower limit value of the receiver strobe indicated by the receiver number in a case where the sign is "+", and indicates Gno of the upper limit value of the receiver strobe indicated by the receiver number in a case where the sign is "–".

Here, in a case where the "manual light emission amount" is Gno 0.5 and the respective manual light emission amount ranges of the receiver strobes 300b and 300c are the ranges exemplified in the description of step S204, the manual light emission amount is less than the lower limit value of the manual light emission amount of the receiver strobe 300c. In this case, in step S210, data setting is performed as follows.

[Lower limit value/upper limit value] of manual light emission amount of receiver strobe 300b= [Gno 0.5/Gno 40]

[Lower limit value/upper limit value] of manual light emission amount of receiver strobe 300c= [Gno 2/Gno 80]

[Lower limit value/upper limit value] of manual light emission amounts of all strobes for a case where light emission of sender strobe is deactivated=[Gno 0.5/Gno 80]

Manual light emission amount=Gno 0.5

The manual light emission amount falls within the possible manual light emission range of the receiver strobe 300b and is out of the possible manual light emission range of the receiver strobe 300c. Therefore, the out-of-range receiver manual light emission amount data is as follows.

RcvManualRangeOver[1]=[0]

RcvManualRangeOver[2]=[+],[Gno 2]

It should be noted that a case where the "sender strobe setting" included in the light emission information set in step S201 is the "light emission activated setting" will be described later (FIGS. 6A and 6B).

In step S211, the strobe control part 301a notifies the camera 100 of the latest light emission information via the strobe contact group 112.

In step S212, the strobe control part 301a (acquisition unit) determines whether or not the light emission information held by the camera 100 has been received from the camera 100. Specifically, the strobe control part 301a first monitors reception of the light emission information from the camera 100 via the strobe contact group 112. Thereafter, when the reception of the light emission information from the camera 100 via the strobe contact group 112 is completed, the strobe control part 301a determines that the light emission information from the camera 100 has been received (YES in step S212), and advances the processing to step S213.

In step S213, the strobe control part 301a acquires the light emission information (the "sender strobe setting", the "light emission mode", and the "manual light emission amount") acquired from the camera 100 in step S212, and updates (sets) the light emission information held by the strobe control part 301a to the acquired set value of the light emission information (as the latest value).

In a case where it is determined in step S214 that the latest value of the "manual light emission amount" has been updated from the value acquired from the camera 100 last time, the strobe control part 301a returns the processing to step S210 again to execute the in-range receiver light emission detection processing, and notifies the camera 100 of the light emission information in step S211.

In step S215, the strobe control part 301a updates a display of the screen of the strobe display part 304 with the latest value of the light emission information set (updated) in step S213. At this time, the strobe control part 301a transmits the latest value of the set (updated) light emission information also to the camera 100, and updates the display of the screen of the camera display part 105. It should be noted that, in the present embodiment, the same screens (screens 601a and 601b in FIGS. 6A and 6B to be described later) are displayed on the strobe display part 304 and the camera display part 105; however, the screens 601a and 601b may also be displayed only on one display part (for example, the camera display part 105).

Here, in a case where the "out-of-range receiver manual light emission amount data" created in step S210 includes data with the sign "+" or "−", the strobe control part 301a adds the out-of-range receiver manual light emission amount indication to the screen of the strobe display part 304.

With reference to FIGS. 6A and 6B, screen display examples in a case where the "sender strobe setting" is the "light emission activated setting" and in a case where the "sender strobe setting" is the "light emission deactivated setting" will be described, based on the set values shown in steps S204, S207, and S208.

The set values exemplified in the description of the processing of steps S204, S207, and S208 are as follows.

[Lower limit value/upper limit value] of manual
light emission amount of receiver strobe 300b=
[Gno 0.5/Gno 40]

[Lower limit value/upper limit value] of manual
light emission amount of receiver strobe 300c=
[Gno 2/Gno 80]

[Lower limit value/upper limit value] of manual
light emission amounts of all strobes for a case
where light emission of sender strobe is acti-
vated=[Gno 1/Gno 60]

[Lower limit value/upper limit value] of manual
light emission amounts of all strobes for a case
where light emission of sender strobe is deacti-
vated=[Gno 0.5/Gno 80]

In a case where the light emission of the sender strobe is activated, as shown in FIG. 6A, the screen 601a is displayed on (in) the camera 100 and the sender strobe 300a, a screen 602a is displayed on (in) the receiver strobe 300b, and a screen 603a is displayed on (in) the receiver strobe 300c.

As shown on the screen 601a, [light emission amount range: Gno 1 to 60] is displayed as the light emission amount range for all the strobes in the camera 100 and the sender strobe 300a. In this case, the user can set the value of the manual light emission amount for all the strobes within a range of Gno 1 to 60.

Therefore, for example, in a case where it is determined in step S103 that the user has set Gno 1 as the manual light emission amount, [light emission amount setting: Gno 1] is displayed on the camera 100 and the sender strobe 300a.

As shown on the screen 602a, the receiver strobe 300b displays [light emission amount range: Gno 0.5 to 40] as the light emission amount range of the receiver strobe 300b. As shown on the screen 603a, the receiver strobe 300c displays [light emission amount range: Gno 2 to 80] as the light emission amount range of the receiver strobe 300c.

The receiver strobes 300b and 300c are notified of the manual light emission amount in step S216 to be described later. In response to the notification of the manual light emission amount, [light emission amount setting: Gno 1] is displayed on the screen 602a of the receiver strobe 300b, and [light emission amount setting: Gno 2], which is the lower limit value of the light emission amount range of the receiver strobe 300c, is displayed on the screen 603a of the receiver strobe 300c. That is, the manual light emission amount set by the user falls within the light emission amount range for all the strobes and falls within the possible manual light emission range of the receiver strobe 300b. Therefore, the light emission amount of the receiver strobe 300b is set to the notified manual light emission amount. On the other hand, the manual light emission amount set by the user falls within the light emission amount range for all the strobes, and is out of the possible manual light emission range of the receiver strobe 300c. Therefore, the light emission amount of the receiver strobe 300c is set to a value that falls within the possible manual light emission range of the receiver strobe 300c and that has the smallest difference from the notified manual light emission amount (here, to the lower limit value of the possible manual light emission range of the receiver strobe 300c).

In a case where the light emission of the sender strobe is deactivated, as shown in FIG. 6B, the screen 601b is displayed on (in) the camera 100 and the sender strobe 300a, a screen 602b is displayed on (in) the receiver strobe 300b, and a screen 603b is displayed on (in) the receiver strobe 300c.

As shown on the screen 601b, [light emission amount range: Gno 0.5 to 80] is displayed as the light emission amount range for all the strobes in the camera 100 and the sender strobe 300a. In this case, the user can set the value of the manual light emission amount for all the strobes within a range of Gno 0.5 to 80.

Therefore, for example, in a case where it is determined in step S103 that the user has set Gno 0.5 as the manual light emission amount, [light emission amount setting: Gno 0.5] is displayed on the camera 100 and the sender strobe 300a.

As shown on the screen 602b, the receiver strobe 300b displays [light emission amount range: Gno 0.5 to 40] as the light emission amount range of the receiver strobe 300b. As shown on the screen 603b, the receiver strobe 300c displays [light emission amount range: Gno 2 to 80] as the light emission amount range of the receiver strobe 300c.

The receiver strobes 300b and 300c are notified of the manual light emission amount in step S216 to be described later. In response to the notification of the manual light emission amount, [light emission amount setting: Gno 0.5] is displayed on the screen 602b of the receiver strobe 300b, and [light emission amount setting: Gno 2], which is the lower limit value of the light emission amount range of the receiver strobe 300c, is displayed on the screen 603b of the receiver strobe 300c. That is, the manual light emission amount set by the user falls within the light emission amount range for all the strobes and falls within the possible manual light emission range of the receiver strobe 300b. Therefore, the light emission amount of the receiver strobe 300b is set to the notified manual light emission amount. On the other hand, the manual light emission amount set by the user falls within the light emission amount range for all the strobes, and is out of the possible manual light emission range of the receiver strobe 300c. Therefore, the light emission amount of the receiver strobe 300c is set to a value that falls within the possible manual light emission range of the receiver strobe 300c and that has the smallest difference from the notified manual light emission amount (here, to the lower limit value of the possible manual light emission range of the receiver strobe 300c).

Next, the out-of-range receiver manual light emission amount data created in a case where the manual light emission amount set by the user is out of the possible manual light emission range of any one of the receiver strobes 300b and 300c will be described. Here, a case where the manual light emission amount set by the user described above is out of the possible manual light emission range of the receiver strobe 300c will be described.

The pieces of "out-of-range receiver manual light emission amount data" of the receiver strobe 300b and the receiver strobe 300c are as follows.

RcvManualRangeOver[1]=[0]

RcvManualRangeOver[2]=[+],[Gno 2]

The data shown on the upper side is the out-of-range receiver manual light emission amount data of the receiver strobe 300b since [receiver number] is "1". [Sign] on the right side of the data shown on the upper side is "0", which indicates that the manual light emission amount set by the user is within the possible manual light emission range of the receiver strobe 300b.

The data shown on the lower side is the out-of-range receiver manual light emission amount data of the receiver strobe 300c since [receiver number] is "2". [Sign] on the right side of the data shown on the lower side is "+", which indicates that the possible manual light emission range of the receiver strobe 300c is set to a range over the manual light emission amount set by the user. "Gno 2" on the right side of the data shown on the lower side indicates that the guide number currently set instead of the manual light emission amount set by the user is 2.

In the present embodiment, a case where the manual light emission amount set by the user is less than the lower limit value of the possible manual light emission range of the receiver strobe has been described; however, the present invention is not limited thereto. For example, even in a case where the manual light emission amount set by the user is more than the upper limit value of the possible manual light emission range of the receiver strobe, the similar method can be applied.

With the above configuration, as various types of information are added to the display, it is possible to notify the user of what receiver strobe is out of range by what light emission amount.

The description returns to FIG. 4 again. In step S216, the strobe control part 301a (notification unit) notifies the receiver strobes 300b and 300c of the latest light emission information via the strobe wireless antenna part 308a. Thereafter, the strobe control part 301a ends the processing of FIG. 4.

Figure 5:
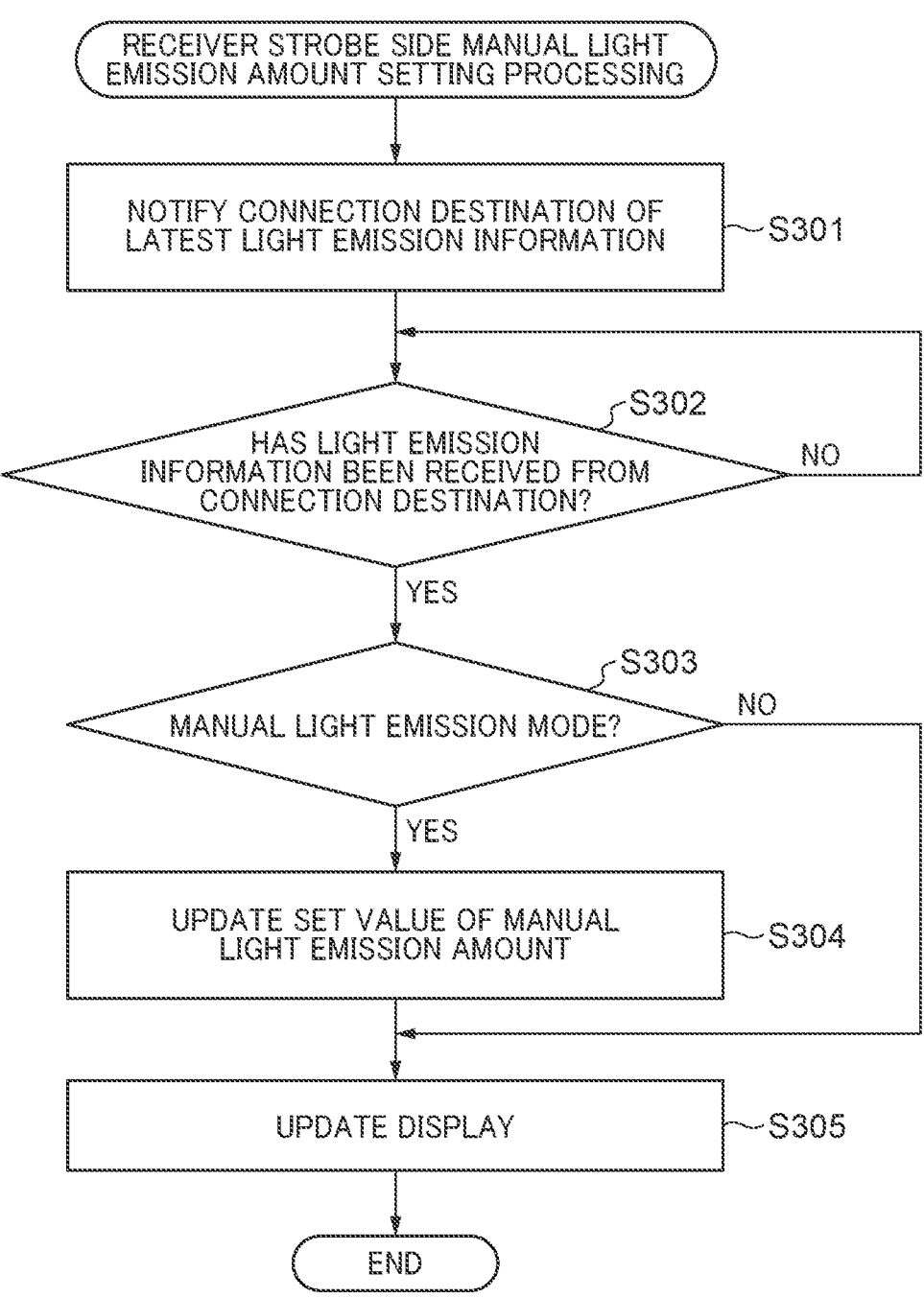
FIG. 5 is a flowchart of a receiver strobe side manual light emission amount setting processing according to the first and second embodiments.

FIG. 5 is a flowchart of a receiver strobe 300b side manual light emission amount setting processing according to the present embodiment. It should be noted that the receiver strobe 300c side manual light emission amount setting processing is similar to the processing shown in the flowchart of FIG. 5, and thus a description thereof is omitted.

In step S301, a strobe control part 301b notifies the sender strobe 300a as a connection destination of the latest light emission information held by the strobe control part 301b via a strobe wireless antenna part 308b.

In step S302, the strobe control part 301b determines whether or not the light emission information held by the sender strobe 300a has been received from the sender strobe 300a as the connection destination. Specifically, the strobe control part 301b first monitors reception of the light emission information from the sender strobe 300a as the connection destination by using a strobe wireless communication part 307b. Thereafter, when the strobe wireless communication part 307b has completed the reception of the light emission information via the strobe wireless antenna part 308b, the strobe control part 301b determines that the light emission information has been received from the sender strobe 300a as the connection destination (YES in step S302), and advances the processing to step S303.

In step S303, the strobe control part 301b determines whether or not the "light emission mode" included in the light emission information received from the sender strobe 300a as the connection destination is set to the "manual light emission mode".

In a case where the "light emission mode" included in the received light emission information is set to the "manual light emission mode" (YES in step S303), the strobe control part 301b sets the "light emission mode" of the receiver strobe 300b to the "manual light emission mode", and then advances the processing to step S304.

On the other hand, in a case where the "light emission mode" included in the received light emission information is set to the "automatic dimming light emission mode" (NO in step S303), the strobe control part 301b sets the "light emission mode" of the receiver strobe 300b to the "automatic dimming light emission mode", and then advances the processing to step S305.

In step S304, the strobe control part 301b (update unit) updates the set value of the manual light emission amount of the receiver strobe 300b based on the "manual light emission amount" of the light emission information obtained from the sender strobe 300a as the connection destination.

In step S305, the strobe control part 301b updates a display on the screen of the strobe display part 304. Specifically, in a case where the "light emission mode" of the receiver strobe 300b is set to the "manual light emission mode", the strobe control part 301b displays the value of the "manual light emission amount" updated in step S304 on the screen of the strobe display part 304. On the other hand, in a case where the "light emission mode" of the receiver strobe 300b is set to the "automatic dimming light emission mode", the strobe control part 301b displays the value of the light emission amount calculated by the strobe control part 301b based on the automatic dimming result on the screen of the strobe display part 304. Thereafter, the strobe control part 301b ends the processing of FIG. 5.

In the present embodiment, various settings of the strobe 300 are determined by a user operation on the camera operation part 106; however, various settings of the strobe 300 may be determined by a user operation on the strobe operation part 303.

Further, the manual light emission amount of the present embodiment is expressed by using Gno (guide number); however, the manual light emission amount may be expressed in any form as long as a change in light emission amount can be shown, such as a display using a relative value with respect to the maximum light emission amount or a step display, and the expression of the manual light emission amount is not limited to the expression using Gno. For example, in a case where the manual light emission amount is expressed by a relative value (½, ¼, or the like) with respect to the maximum light emission amount, only the lower limit value may be communicated between the devices as the possible manual light emission range.

According to the present embodiment, in a case where the sender strobe setting is the light emission activated setting, the best manual light emission performance of the sender strobe 300*a* can be achieved. On the other hand, in a case where the sender strobe setting is the light emission deactivated setting, the best manual light emission performances of the receiver strobes 300*b* and 300*c* can be achieved. As a result, it is possible to improve light emission performance at the time of manual light emission.

Hereinafter, an operation of an image pickup system 1*a* according to a second embodiment will be described with reference to FIGS. 5, 7A, 7B, and 8.

In the following description of the second embodiment, the same reference signs denote the components similar to those of the first embodiment, and an overlapping description will be omitted.

Figure 7A:
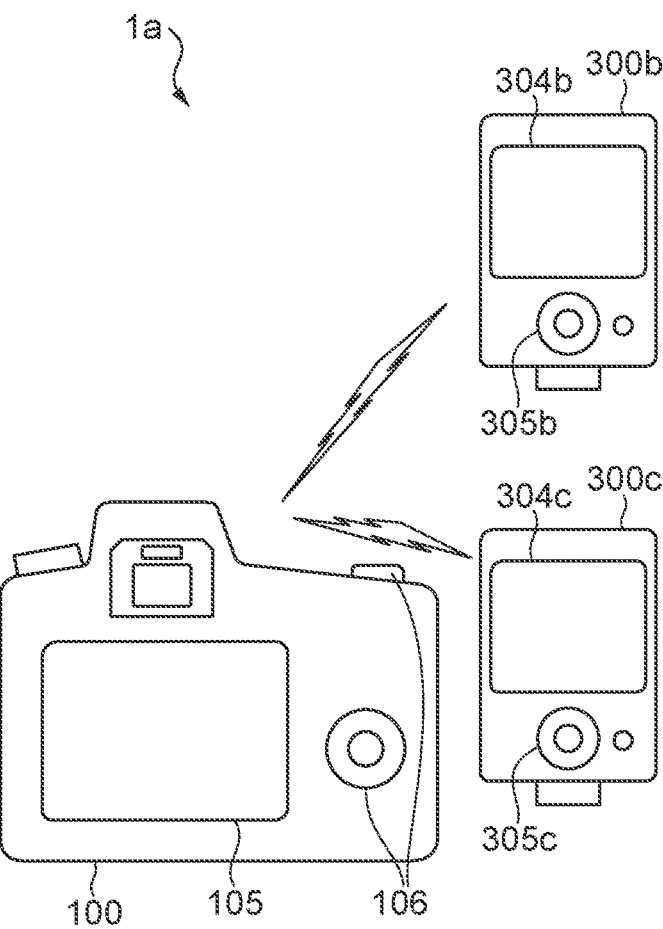
FIGS. 7A and 7B are schematic configuration diagrams of an image pickup system according to the second embodiment in which a camera is wirelessly connected to a plurality of strobes.
Figure 7B:
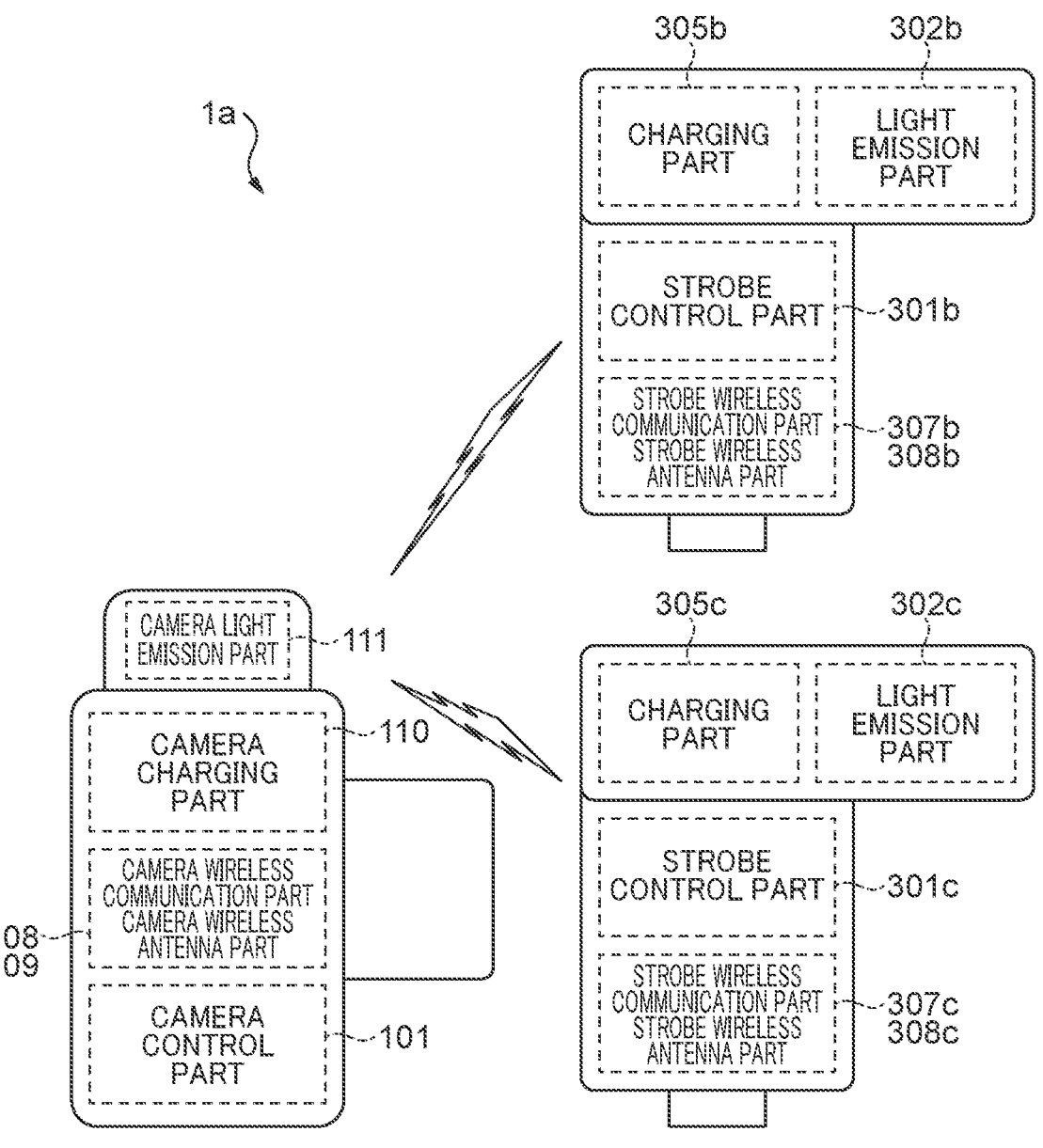

FIGS. 7A and 7B are schematic configuration diagrams of the image pickup system 1*a* according to the second embodiment in which a camera 100 is wirelessly connected to a plurality of strobes (receiver strobes 300*b* and 300*c*).

FIG. 7A is a rear view illustrating each apparatus (the camera 100, and the receiver strobes 300*b* and 300*c*) included in the image pickup system 1*a*. FIG. 7B is a side view of each apparatus included in the image pickup system 1*a*.

In the present embodiment, the first receiver strobe which starts wireless connection to the camera 100 is the receiver strobe 300*b*, and the second receiver strobe is the receiver strobe 300*c*.

A camera wireless communication part 108 transmits and receives light emission information and the like to and from the receiver strobes 300*b* and 300*c* via a camera wireless antenna part 109.

A camera control part 101 manages a lower limit value and an upper limit value of a light emission amount set in accordance with the performance of a camera light emission part 111 and a camera charging part 110. In the present embodiment, a camera light emission part 111 functions as a sender strobe.

The same applies to the receiver strobes 300*b* and 300*c*. Each of strobe control parts 301*b* and 301*c* manages a lower limit value and an upper limit value of the light emission amount set in accordance with the performance of each of light emission parts 302*b* and 302*c* and each of charging parts 305*b* and 305*c*.

It should be noted that, in the present embodiment, the number of receiver strobes wirelessly connected to the camera 100 is two, but may be one or three or more.

Figure 8:
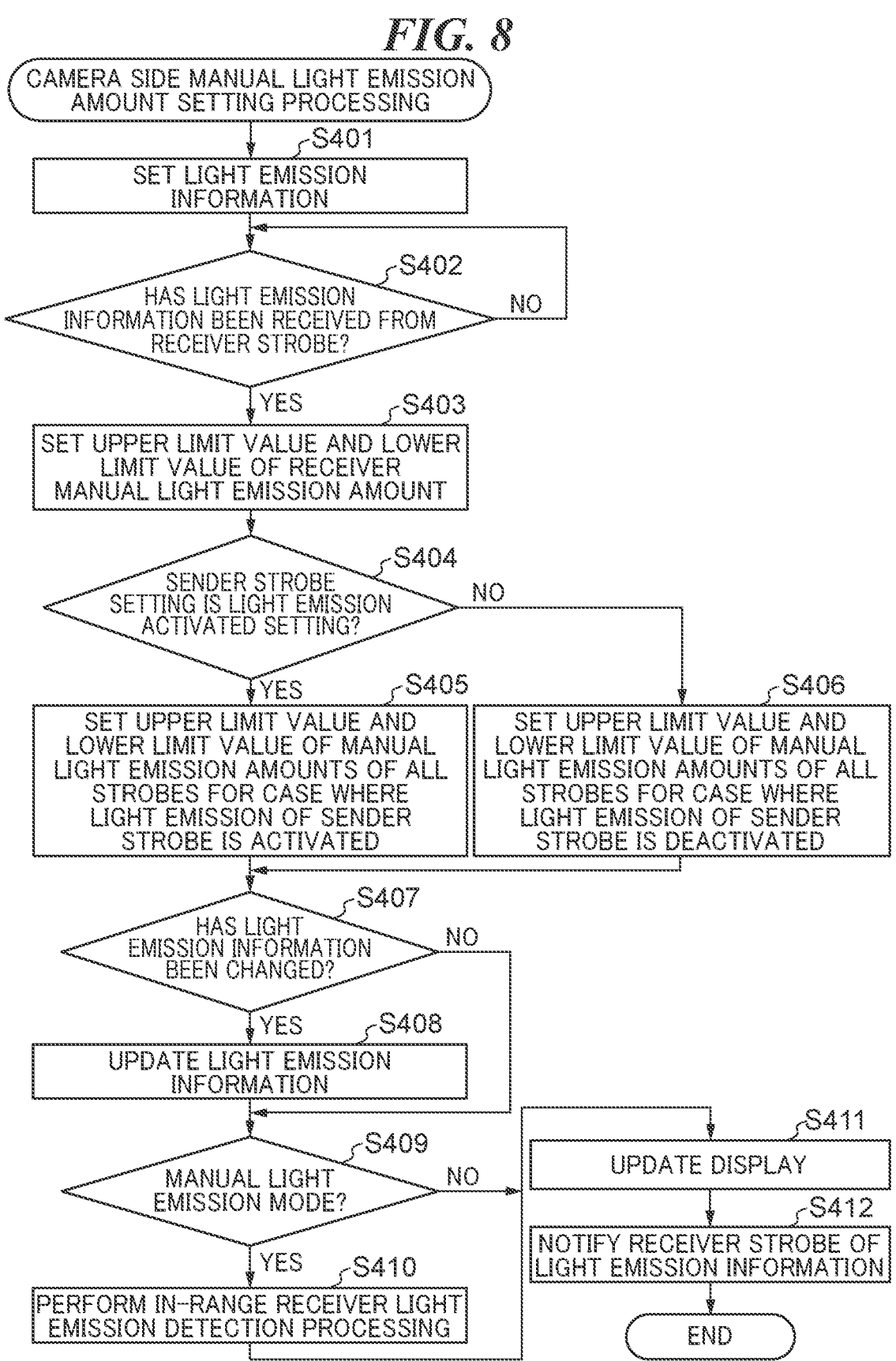
FIG. 8 is a flowchart of camera side manual light emission amount setting processing according to the second embodiment.

FIG. 8 is a flowchart of camera 100 side manual light emission amount setting processing according to the second embodiment, which is executed by the camera control part 101 of the camera 100. This processing is executed in accordance with the start of the camera 100.

In step S401, first, the camera control part 101 reads light emission information stored in a RAM (not shown) in the camera control part 101 as an initial value, and performs setting by using the read light emission information.

In step S402, the camera control part 101 determines whether or not light emission information held by the receiver strobes 300*b* and 300*c* has been received from the receiver strobes 300*b* and 300*c*. Specifically, the camera control part 101 first monitors the reception of the light emission information from the receiver strobes 300*b* and 300*c* by using the camera wireless communication part 108. Thereafter, when the camera wireless communication part 108 has completed the reception of the light emission information via the camera wireless antenna part 109 (YES in step S402), the camera control part 101 advances the processing to step S403.

It should be noted that, also in the processing of FIG. 8, processing similar to the determination processing of step S202 of FIG. 4, that is, processing of determining whether or not the light emission information held by the receiver strobes 300*b* and 300*c* can be acquired from the receiver strobes 300*b* and 300*c*, may be provided between steps S401 and S402. In a case where the determination processing is provided, in a case where it is determined that the light emission information can be acquired from the receiver strobes 300*b* and 300*c*, the processing proceeds to step S402; and otherwise, the camera control part 101 performs the processing similar to step S205, and then the processing proceeds to step S404.

In step S403, the camera control part 101 selects the maximum value from the upper limit values of the manual light emission amounts included in the light emission information received in step S402, and sets the maximum value as an upper limit value of a receiver manual light emission amount. Similarly, the camera control part 101 selects the minimum value from the lower limit values of the manual light emission amounts included in the light emission information received in step S402, and sets the minimum value as a lower limit value of the receiver manual light emission amount.

In step S404, the camera control part 101 determines whether or not "sender strobe setting" of the light emission information is "light emission activated setting". Specifically, in a case where the camera light emission part 111 is in a use state by the camera operation part 106, the camera control part 101 determines that the "sender strobe setting" of the light emission information is the "light emission activated setting" (light emission of sender strobe is activated) (YES in step S404), and advances the processing to step S405. On the other hand, in a case where the camera light emission part 111 is in an unused state by the camera operation part 106, the camera control part 101 determines that the "sender strobe setting" of the light emission information is "light emission deactivated setting" (light emission of sender strobe is deactivated) (NO in step S404), and advances the processing to step S406.

In step S405, the upper limit value and the lower limit value of the manual light emission amount of all the strobes to be used for a case where the "sender strobe setting" is the "light emission activated setting" are set. It should be noted that all the strobes refer to all the strobes existing in the image pickup system 1*a*, that is, refer to the camera light emission part 111 of the camera 100 that functions as the sender strobe, and the receiver strobes 300*b* and 300*c*. In this case, a range from the upper limit value to the lower limit value of the manual light emission amount of the camera light emission part 111 is set as a range from the upper limit value to the lower limit value of the manual light emission amounts of all the strobes. That is, the camera control part 101 reads the upper limit value and the lower limit value of the manual light emission amount of the camera light emission part 111 from the RAM (not shown), and sets the read upper limit value and the read lower limit value as the upper limit value and the lower limit value of the manual light emission amounts of all the strobes.

In step S406, the upper limit value and the lower limit value of the manual light emission amounts of all the strobes to be used for a case where the "sender strobe setting" is the "light emission deactivated setting" are set. It should be noted that, here, all the strobes refer to all the strobes existing in the image pickup system 1*a*; however, here, the setting in the camera light emission part 111 functioning as the sender strobe is set as the "light emission deactivated setting", and thus all the strobes substantially refer to the receiver strobes 300*b* and 300*c*. In this case, the upper limit value and the lower limit value of the receiver manual light emission amount set in step S403 are set as the upper limit value and the lower limit value of the manual light emission amount of all the strobes.

In step S407, it is determined whether or not the user has changed the light emission information by using the camera operation part 106. Here, the light emission information changeable by the user includes the "sender strobe setting (light emission activated setting or light emission deactivated setting)", the "light emission mode (manual light emission mode or automatic dimming light emission mode)", and the "manual light emission amount".

In a case where the user has changed the light emission information by using the camera operation part 106 (YES in step S407), the processing proceeds to step S408, and in a case where the user has not changed the light emission information (NO in step S407), the processing proceeds to step S409.

In step S408, the camera control part 101 updates the set value of the light emission information from the value of the light emission information set in step S401 to the value of the light emission information set (changed) by the user in step S407.

In step S409, the camera control part 101 determines whether or not a "light emission mode" of the light emission information updated in step S408 is set to a "manual light emission mode". In a case where the "light emission mode" is set to the "manual light emission mode" (YES in step S409), the camera control part 101 advances the processing to step S410. On the other hand, in a case where the "light emission mode" is not set to the "manual light emission mode" but set to an "automatic dimming light emission mode" (NO in step S409), the camera control part 101 advances the processing to step S411.

In step S410, the camera control part 101 performs in-range receiver light emission detection processing of detecting whether or not the "manual light emission amount" included in the light emission information updated in step S408 falls within a possible manual light emission range of each receiver strobe 300*b*, 300*c*.

Similarly to step S210, also in step S410, "out-of-range receiver manual light emission amount data" is created. Then, in a case where the manual light emission amount is out of the possible manual light emission range of at least one of the receiver strobes 300*b* and 300*c*, information indicating the fact is displayed on a screen of a camera display part 105 in step S411 to be described later.

In step S411, the camera control part 101 displays the latest value of the light emission information set (updated) in step S408 on the screen of the camera display part 105. Here, in a case where the "out-of-range receiver manual light emission amount data" created in step S410 includes data with the sign "+" or "−", the camera control part 101 adds the out-of-range receiver manual light emission amount indication to the screen of the camera display part 105.

In step S412, the camera control part 101 notifies the receiver strobes 300*b* and 300*c* of the latest light emission information via the camera wireless antenna part 109. Thereafter, the camera control part 101 ends the processing of FIG. 8.

Next, manual light emission amount setting processing according to the present embodiment executed by a strobe control part 301*b* of the receiver strobe 300*b* will be described with reference to the flowchart of FIG. 5. It should be noted that manual light emission amount setting processing executed by a strobe control part 301*c* of the receiver strobe 300*c* is similar to the processing shown in the flowchart of FIG. 5 to be described below, and thus a description thereof is omitted.

As described in detail below, the processing shown in FIG. 5 in the second embodiment is different from the processing shown in FIG. 5 in the first embodiment in that the connection destination is not the sender strobe 300*a* but the camera 100.

In step S301, the strobe control part 301*b* notifies the camera 100 as the connection destination of the latest light emission information held by the strobe control part 301*b* via a strobe wireless antenna part 308*b*.

In step S302, the strobe control part 301*b* determines whether or not the light emission information held by the camera 100 has been received from the camera 100 as the connection destination. Specifically, the strobe control part 301*b* first monitors reception of the light emission information from the camera 100 as the connection destination by using a strobe wireless communication part 307*b*. Thereafter, when the strobe wireless communication part 307*b* has completed the reception of the light emission information via the strobe wireless antenna part 308*b*, the strobe control part 301*b* determines that the light emission information has been received from the camera 100 as the connection destination (YES in step S302), and advances the processing to step S303.

Since the processing of step S303 and subsequent steps is similar to the processing of step S303 and subsequent steps of the first embodiment, details thereof will be omitted. After performing the processing of steps S303 to S305, the strobe control part 301*b* ends the processing of FIG. 5.

According to the present embodiment, in a case where the sender strobe setting is the light emission activated setting, the best manual light emission performance of the camera light emission part 111 functioning as the sender strobe can be achieved. On the other hand, in a case where the sender strobe setting is the light emission deactivated setting, the best manual light emission performances of the receiver strobes 300*b* and 300*c* can be achieved. As a result, it is possible to improve light emission performance at the time of manual light emission.

It should be noted that the present embodiment can also be implemented by processing in which a program that implements one or more functions is supplied to a computer of a system or apparatus via a network or storage medium, and a system control part of the system or apparatus reads and executes the program. The system control part can include one or a plurality of processors or circuits, and can include a network of a plurality of isolated system control parts or a plurality of isolated processors or circuits to read and execute executable instructions.

A processor or circuit can include a central processing unit (CPU), a micro processing unit (MPU), a graphics processing unit (GPU), an application specific integrated circuit (ASIC), and a field programmable gate array (FPGA). The processor or circuit can also include a digital signal processor (DSP), a data flow processor (DFP), or a neural processing unit (NPU).

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-139310, filed Sep. 1, 2022, which is hereby incorporated by reference wherein in its entirety.

What is claimed is:

1. An image pickup system that includes an image pickup apparatus, a sender device including a first light emission part, and a receiver device including a second light emission part and controls light emission amounts of the sender device and the receiver device, the image pickup system comprising:

at least one memory that stores a set of instructions; and at least one processor that is configured to, based on the instructions, cause the image pickup apparatus to:

set manual light emission amounts of the sender device and the receiver device; and set the sender device to have light emission activated setting or light emission deactivated setting, cause the sender device to:

change a light emission amount settable range in which the manual light emission amount is settable, between a case where the sender device is set to have the light emission activated setting and a case where the sender device is set to have the light emission deactivated setting; and notify the receiver device of the set manual light emission amount, and cause the receiver device to:

update the manual light emission amount of the receiver device based on the manual light emission amount notified from the sender device.

2. The image pickup system according to claim 1, wherein the image pickup apparatus displays the light emission amount settable range.

3. The image pickup system according to claim 1, wherein in a case where the sender device is set to have the light emission activated setting, the light emission amount settable range is determined as a possible sender side light emission range from an upper limit value to a lower limit value of the manual light emission amount settable in the sender device, and in a case where the sender device is set to have the light emission deactivated setting, the light emission amount settable range is determined as a possible receiver side light emission range from an upper limit value to a lower limit value of the manual light emission amount settable in the receiver device.

4. The image pickup system according to claim 3, wherein the possible receiver side light emission range is preset in the sender device.

5. The image pickup system according to claim 3, wherein the possible receiver side light emission range is acquired from the receiver device.

6. The image pickup system according to claim 5, comprising a plurality of the receiver devices, wherein in a case where the receiver devices include a first receiver device and a second receiver device having different possible manual light emission ranges, a maximum value is selected from among an upper limit value of the possible manual light emission range of the first receiver device and an upper limit value of the possible manual light emission range of the second receiver device, and the selected maximum value is determined as an upper limit value of the possible receiver side light emission range, and a minimum value is selected from among a lower limit value of the possible manual light emission range of the first receiver device and a lower limit value of the possible manual light emission range of the second receiver device, and the selected minimum value is determined as a lower limit value of the possible receiver side light emission range.

7. The image pickup system according to claim 6, wherein the at least one processor further causes the image pickup apparatus to notify, in a case where the manual light emission amount set by the image pickup apparatus is out of the possible manual light emission range of the first receiver device, that the manual light emission amount is out of the possible light emission range of the first receiver device.

8. The image pickup system according to claim 6, wherein the at least one processor further causes the receiver device to update, in a case where the manual light emission amount set by the image pickup apparatus is out of the possible light emission range of the first receiver device, a light emission amount of the first receiver device to a value that falls within the possible light emission range of the first receiver device and that has a smallest difference from the manual light emission amount.

9. The image pickup system according to claim 6, wherein the at least one processor further causes the receiver device to update, in a case where the manual light emission amount set by the image pickup apparatus falls within the possible light emission range of the second receiver device, a light emission amount of the second receiver device to the manual light emission amount set by the image pickup apparatus.

10. The image pickup system according to claim 1, wherein the image pickup apparatus functions as the sender device.

11. The image pickup system according to claim 1, wherein in a case where the sender device is set to have the light emission activated setting, the sender device causes the first light emission part to perform light emission to irradiate auxiliary light when shooting with the image pickup apparatus, and in a case where the sender device is set to have the light emission deactivated setting, the sender device does not cause the first light emission part to perform light emission to irradiate the auxiliary light when shooting with the image pickup apparatus.

12. A control apparatus that controls a sender device which electrically connects to an image pickup apparatus and includes a first light emission part, the sender device being configured to wirelessly communicate with a receiver device which includes a second light emission part, the control apparatus comprising:

at least one memory that stores a set of instructions; and at least one processor that is configured to, based on the instructions, cause the control apparatus to:

acquire, from the image pickup apparatus, manual light emission amounts of the sender device and the receiver device, and setting in which the sender device is set to have one of light emission activated setting and light emission deactivated setting, which are set in the image pickup apparatus;

change a light emission amount settable range in which the manual light emission amount is settable in the image pickup apparatus, between a case where the sender device is set to have the light emission activated setting and a case where the sender device is set to have the light emission deactivated setting; and notify the receiver device of the manual light emission amount acquired from the image pickup apparatus.

13. A control method for an image pickup system including an image pickup apparatus, a sender device including a first light emission part, and a receiver device including a second light emission part, the image pickup system controlling light emission amounts of the sender device and the receiver device, the control method comprising:

in the image pickup apparatus, setting manual light emission amounts of the sender device and the receiver device;

setting the sender device to have light emission activated setting or light emission deactivated setting;

in the sender device, changing a light emission amount settable range in which the manual light emission amount is settable, between a case where the sender device is set to have the light emission activated setting and a case where the sender device is set to have the light emission deactivated setting;

notifying the receiver device of the set manual light emission amount; and in the receiver device, updating the manual light emission amount of the receiver device based on the manual light emission amount notified from the sender device.

14. A control method for a control apparatus that controls a sender device which electrically connects to an image pickup apparatus and includes a first light emission part, the sender device being configured to wirelessly communicate with a receiver device which includes a second light emission part, the control method comprising:

acquiring, from the image pickup apparatus, manual light emission amounts of the sender device and the receiver device, and setting in which the sender device is set to have one of light emission activated setting and light emission deactivated setting, which are set in the image pickup apparatus;

changing a light emission amount settable range in which the manual light emission amount is settable in the image pickup apparatus, between a case where the sender device is set to have the light emission activated setting and a case where the sender device is set to have the light emission deactivated setting; and notifying the receiver device of the manual light emission amount acquired from the image pickup apparatus.

15. A non-transitory storage medium storing a computer-executable program for causing a computer to execute a control method for an image pickup system which includes an image pickup apparatus, a sender device including a first light emission part, and a receiver device including a second light emission part, wherein the image pickup system controls light emission amounts of the sender device and the receiver device, the control method comprising:

in the image pickup apparatus, setting manual light emission amounts of the sender device and the receiver device;

setting the sender device to have light emission activated setting or light emission deactivated setting;

in the sender device, changing a light emission amount settable range in which the manual light emission amount is settable, between a case where the sender device is set to have the light emission activated setting and a case where the sender device is set to have the light emission deactivated setting;

notifying the receiver device of the set manual light emission amount; and in the receiver device, updating the manual light emission amount of the receiver device based on the manual light emission amount notified from the sender device.

16. A non-transitory storage medium storing a computer-executable program for causing a computer to execute a control method for a control apparatus that controls a sender device which electrically connects to an image pickup apparatus and includes a first light emission part, the sender device being configured to wirelessly communicate with a receiver device which includes a second light emission part, the control method comprising:

acquiring, from the image pickup apparatus, manual light emission amounts of the sender device and the receiver device, and setting in which the sender device is set to have one of light emission activated setting and light emission deactivated setting, which are set in the image pickup apparatus;

changing a light emission amount settable range in which the manual light emission amount is settable in the image pickup apparatus, between a case where the sender device is set to have the light emission activated setting and a case where the sender device is set to have the light emission deactivated setting; and notifying the receiver device of the manual light emission amount acquired from the image pickup apparatus.

* * * * *